United States Patent
Mukherjee

(10) Patent No.: US 10,638,512 B2
(45) Date of Patent: Apr. 28, 2020

(54) MULTIPLEXING MULTI-RADIO ACCESS TECHNOLOGY TRANSMISSIONS

(71) Applicant: Verizon Patent and Licensing Inc., Arlington, VA (US)

(72) Inventor: Amitav Mukherjee, Elk Grove, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 59 days.

(21) Appl. No.: 15/975,133

(22) Filed: May 9, 2018

(65) Prior Publication Data

US 2019/0349991 A1 Nov. 14, 2019

(51) Int. Cl.
| | |
|---|---|
| *H04W 74/08* | (2009.01) |
| *H04W 16/14* | (2009.01) |
| *H04W 48/16* | (2009.01) |
| *H04W 72/04* | (2009.01) |
| *H04L 5/14* | (2006.01) |
| *H04L 5/00* | (2006.01) |

(52) U.S. Cl.
CPC .......... *H04W 74/0808* (2013.01); *H04L 5/14* (2013.01); *H04W 16/14* (2013.01); *H04W 48/16* (2013.01); *H04W 72/0406* (2013.01); *H04W 72/0446* (2013.01); *H04L 5/0007* (2013.01)

(58) Field of Classification Search
CPC ........ H04L 5/0007; H04L 5/14; H04L 47/70; H04W 16/14; H04W 48/16; H04W 72/00; H04W 72/04; H04W 72/0406; H04W 72/0446; H04W 72/12; H04W 72/1263; H04W 40/24; H04W 40/246; H04W 28/00; H04W 74/00; H04W 74/02; H04W 74/08; H04W 74/0808
See application file for complete search history.

(56) References Cited

U.S. PATENT DOCUMENTS

| | | | |
|---|---|---|---|
| 2009/0191906 A1* | 7/2009 | Abedi | H04W 16/14 455/501 |
| 2010/0111047 A1* | 5/2010 | Yang | H04W 52/0216 370/336 |
| 2011/0269453 A1* | 11/2011 | Ranta-Aho | H04L 5/001 455/424 |
| 2012/0120821 A1* | 5/2012 | Kazmi | H04W 56/0005 370/252 |
| 2012/0120944 A1* | 5/2012 | Yang | H04L 7/04 370/350 |
| 2012/0129517 A1* | 5/2012 | Fox | H04L 41/5025 455/425 |

(Continued)

Primary Examiner — Warner Wong

(57) ABSTRACT

A device may monitor a frequency band over a time interval; determine that the frequency band is not occupied by transmissions to or from another device based on information obtained from monitoring the frequency band over the time interval; schedule transmissions of a first set of orthogonal frequency division multiple access (OFDM) symbols within a particular time interval over the frequency band, wherein the first set of OFDM symbols is associated with a first radio access technology; and schedule transmissions of a second set of OFDM symbols within the particular time interval over the frequency band, wherein the second set of OFDM symbols is associated with a second radio access technology.

20 Claims, 14 Drawing Sheets

(56) References Cited

U.S. PATENT DOCUMENTS

| | | | |
|---|---|---|---|
| 2012/0140743 A1* | 6/2012 | Pelletier | H04W 72/0453 370/335 |
| 2012/0263118 A1* | 10/2012 | Love | H04W 72/1215 370/329 |
| 2013/0028117 A1* | 1/2013 | Montojo | H04L 5/001 370/252 |
| 2013/0208664 A1* | 8/2013 | Viswanathan | H04W 52/243 370/329 |
| 2013/0308595 A1* | 11/2013 | Ratasuk | H04W 16/06 370/330 |
| 2014/0043979 A1* | 2/2014 | Etemad | H04W 4/70 370/237 |
| 2015/0195766 A1* | 7/2015 | Lee | H04W 28/0284 370/235 |
| 2015/0237645 A1* | 8/2015 | Andrianov | H04W 72/1215 370/329 |
| 2015/0351095 A1* | 12/2015 | Wilhelmsson | H04W 72/0453 370/329 |
| 2016/0100400 A1* | 4/2016 | Lu | H04W 4/80 370/336 |
| 2016/0135213 A1* | 5/2016 | Zhu | H04L 1/00 370/329 |
| 2016/0309394 A1* | 10/2016 | Pelletier | H04W 72/0453 |
| 2017/0013469 A1* | 1/2017 | Larsson | H04W 16/14 |
| 2017/0265214 A1* | 9/2017 | Hessler | H04B 7/0456 |
| 2017/0353977 A1* | 12/2017 | Alsohaily | H04W 76/10 |
| 2017/0367000 A1* | 12/2017 | Pragada | H04W 16/14 |
| 2018/0020462 A1* | 1/2018 | Xiong | H04W 72/1215 |
| 2018/0070369 A1* | 3/2018 | Papasakellariou | H04B 7/024 |
| 2018/0368153 A1* | 12/2018 | Li | H04W 72/12 |
| 2018/0368199 A1* | 12/2018 | Zeng | H04B 7/2643 |
| 2019/0159253 A1* | 5/2019 | Koorapaty | H04W 74/0808 |
| 2019/0173626 A1* | 6/2019 | Wang | H04L 5/001 |
| 2019/0174325 A1* | 6/2019 | Fischer | H04W 16/14 |
| 2019/0281580 A1* | 9/2019 | Rune | H04W 68/005 |
| 2019/0305915 A1* | 10/2019 | Zhu | H04L 5/0035 |
| 2019/0342888 A1* | 11/2019 | Hosseini | H04W 72/005 |
| 2019/0387533 A1* | 12/2019 | Papasakellariou | H04W 72/1215 |

* cited by examiner

US 10,638,512 B2

MULTIPLEXING MULTI-RADIO ACCESS TECHNOLOGY TRANSMISSIONS

BACKGROUND INFORMATION

Many wireless organizations continue to utilize Long Term Evolution (LTE) architecture. While LTE is designed to handle large network traffic, the amount of data that can move from mobile devices to the service provider networks is limited by the licensed spectrum available for communication.

To increase the capacity to handle traffic between mobile devices and networks, wireless carriers may utilize LTE-Unlicensed (LTE-U). LTE-U applies LTE to the unlicensed 5 GHz spectrum. By sending data through the 5 GHz frequency band, LTE-U offloads traffic on licensed spectra used by LTE.

License Assisted Access (LAA) is another method for using the unlicensed spectrum. In contrast to LTE-U, LAA enforces the Listen-Before-Talk (LBT) protocol. Any device adhering to LBT would first monitor a communication channel and send data over the channel only when it is not occupied by another device.

DETAILED DESCRIPTION OF PREFERRED EMBODIMENTS

The following detailed description refers to the accompanying drawings. The same reference numbers in different drawings may identify the same or similar elements.

Current and next-generation wireless cellular standards are designed for operation in unlicensed spectra and/or shared spectrum to increase network capacity (e.g., handle more users, traffic, etc.).

To support multiple transmission systems, all transmissions in the unlicensed spectrum may perform a channel sensing procedure prior to transmission, and not occupy the channel for more than a pre-specified time duration, which is known as the maximum channel occupancy time (MCOT), e.g., about 8 milliseconds (ms). When a device is unable to continually transmit for longer than the MCOT and the device uses different radio access technologies (RATs) at the same time over the same RF channels, the device may be forced to operate in inefficient ways (e.g., increase symbol jitters).

As described below, co-located NR and LTE transmissions, in an unlicensed spectrum, from a multi-RAT device (e.g., base station, UE device, etc.) may be multiplexed, so that the NR transmission may avoid having to wait for the MCOT to terminate.

Figure 1:
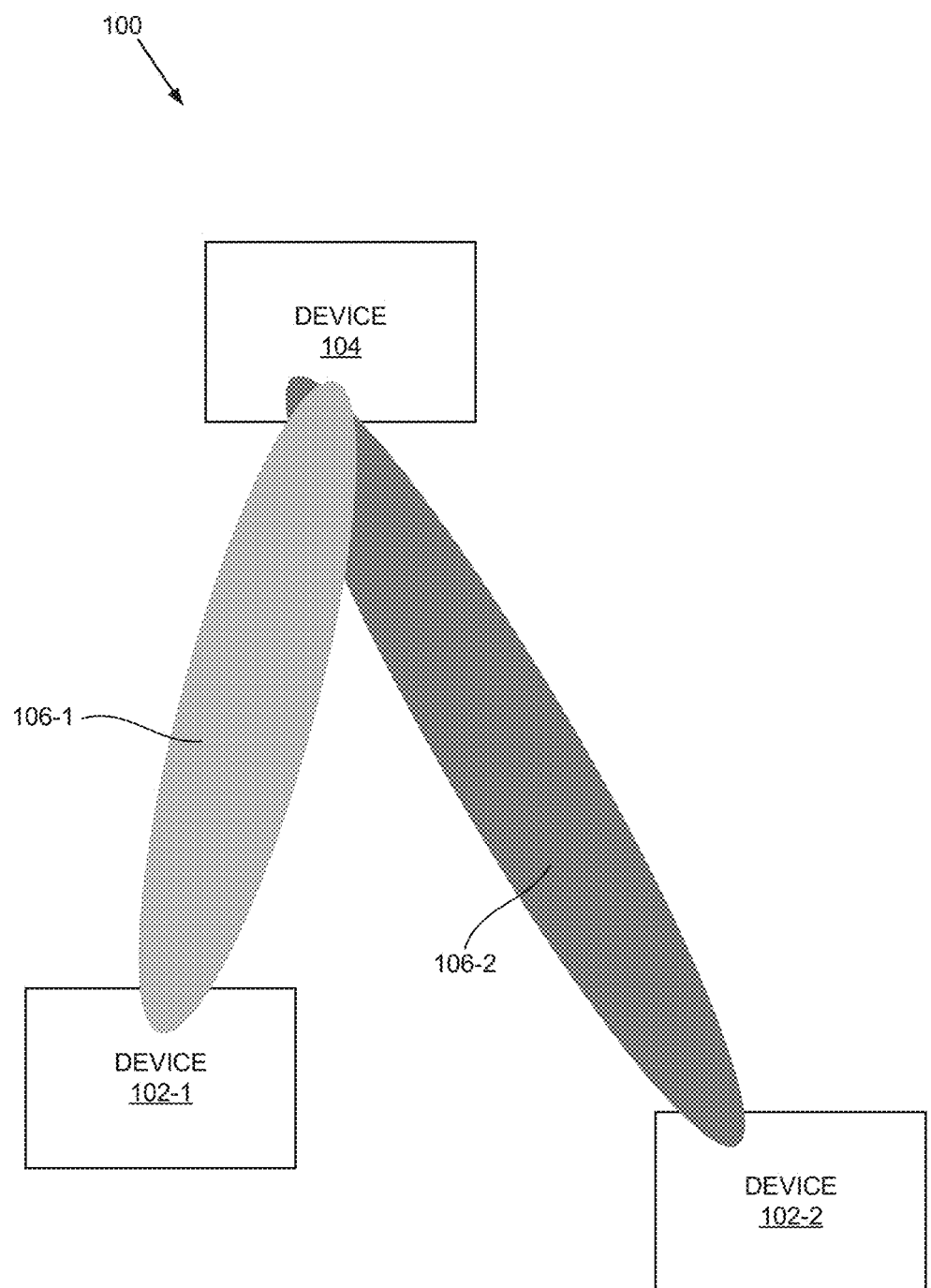
FIG. 1 illustrates concepts described herein.

FIG. 1 illustrates the concepts described herein. As shown, communication environment 100 includes devices 102-1 and 102-2 and a device 104. Device 104 sends signals or data to devices 102-1 and 102-2 over two communication links 106-1 and 106-2. Although links 106-1 and 106-2 are established over two different RAT technologies (e.g., LTE, Wi-Fi, NR, etc.), links 106-1 and 106-2 may occupy the unlicensed spectrum.

To comply with standards, device 104 implements the listen-before-talk (LBT) protocol and monitors the airwaves. Upon detecting that the frequency band is clear, device 104 time multiplexes symbol transmissions over channels 106-1 and 106-2, to avoid potential inter-channel interference during the MCOT. That is, device 104 sends symbols destined for device 102-1 over channel 106-1 during one time slice and sends symbols destined for device 102-2 over channel 106-2 during another time slice, and so forth. Once the MCOT ends, device 104 may repeat the process.

In FIG. 1, without the time multiplexing, device 104 would have had to perform the channel sensing, transmit the symbols destined for device 102-1 over the entire MCOT, perform yet another channel sensing, and then transmit the symbols destined for device 102-2 over the following MCOT. In such a scheme, device 102-2 would have had to wait at least one MCOT before receiving any information from device 104. If a particular application running on device 102-2 required device 102-2 to communicate at a constant rate, the application would suffer from jitter, even if channel 106-2 has the average communication bandwidth necessary to support the application.

Figure 2:
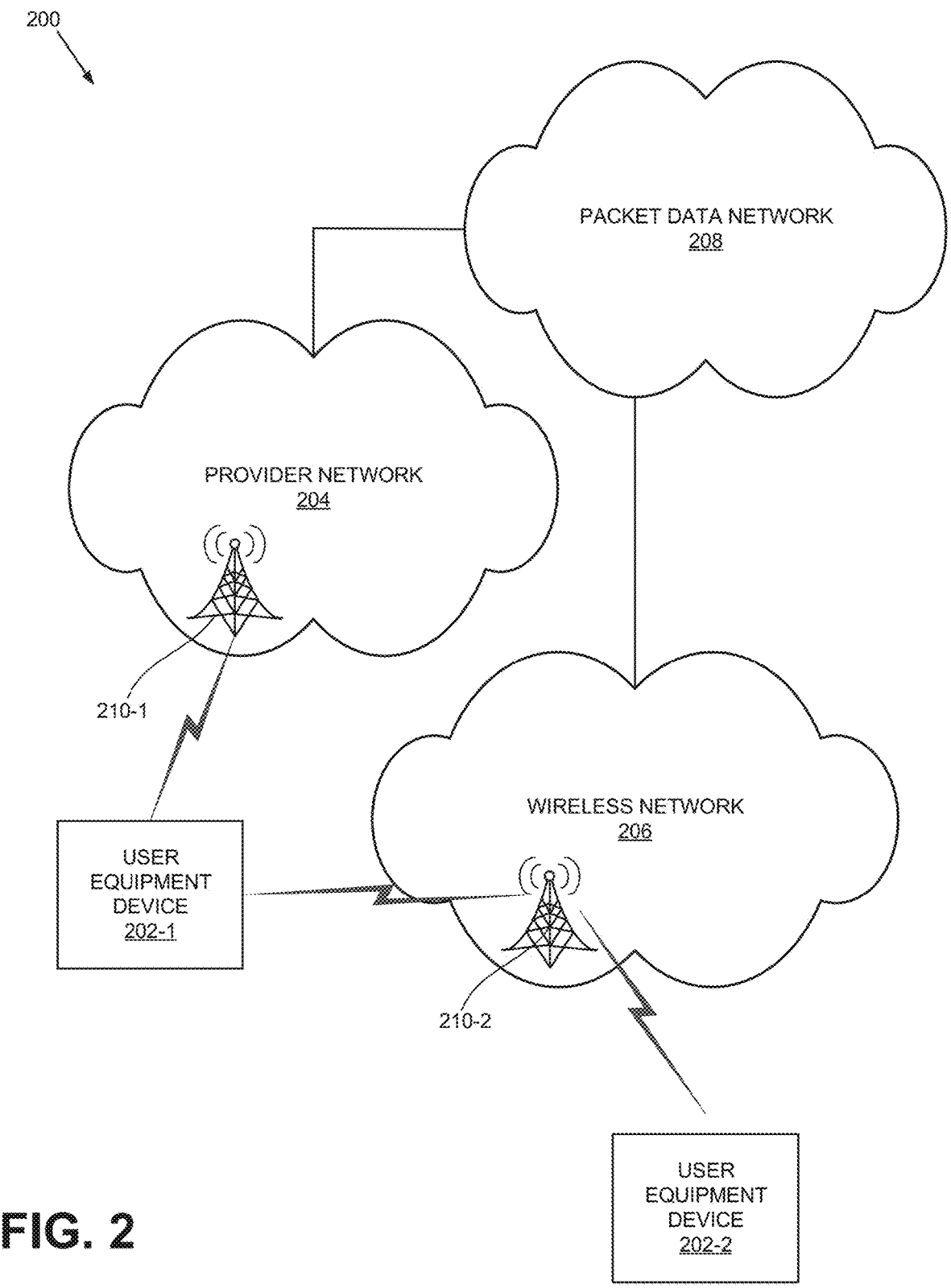
FIG. 2 illustrates exemplary networks in which the concepts described herein may be implemented.

FIG. 2 illustrates an exemplary network environment 200 in which the concepts described herein may be implemented. As shown, environment 200 may include user equipment (UE) devices 202 (UE device 202-1 and UE device 202-2), a provider network 204, a wireless network 206, and a packet data network 208. Although environment 200 may include other devices and components, they are not illustrated for simplicity. For example, environment 200 may include millions of user devices, routers, switches, computers (e.g., servers, personal computers, etc.).

Each UE device 202 may include an electronic device having communication capabilities. For example, UE device 202 may include a smart phone, a wearable computer (e.g., a wrist watch, eye glasses, etc.), a tablet, a set-top box (STB), any type of internet protocol (IP) communications device, a voice over internet protocol (VoIP) device, a laptop computer, a palmtop computer, a gaming device, a media player device, a digital camera that includes communication capabilities (e.g., wireless communication mechanisms), or Internet-of-Things (IoTs).

Consistent with aspects described herein, each UE device 202 may operate in an unlicensed band (e.g., 5 GHz or 60 GHz band) or in a shared band (e.g., 3.5 GHz band). In such bands, UE device 202 may use, at the same time, multiple radio access technologies (RATs). When UE device 202 follows the LBT protocol in uplinks, however, UE device 202 may time multiplex transmitted symbols over the RATs during a single MCOT to avoid interference, as well as to avoid having UE device 202 wait an entire first RAT MCOT period before transmitting via a second RAT. If UE device 202 uses more than two RATs, the wait times may be as long as (R−1)×MCOT, where R is the number of RATs that UE device 202 uses simultaneously in the same band.

Provider network 204 may include one or more wireless and/or wireline networks of any type, such as, for example, a local area network (LAN), wide area network (WAN), wireless local area network (WLAN), wireless satellite network, and/or one or more wireless public land mobile networks (PLMNs). The PLMN(s) may include a Code Division Multiple Access (CDMA) 2000 PLMN, Global System for Mobile Communications (GSM) PLMN, an LTE PLMN, and/or other types of PLMNs not specifically described herein.

The LTE network in provider network 204 has one or more components of LTE, such as, for example, an Evolved Packet Core (EPC), Home Subscriber Service (HSS), packet data network (PDN) gateway, and an evolved UMTS Terrestrial Network (eUTRAN). The eUTRAN includes a base station 210-1, which may be implemented as eNB 210-1. eNB 210-1 may comprise devices and components that allow UE device 202 to wirelessly connect to provider network 204. Although sometimes referred to herein as eNB 210-1, in other network environments, features and functionality associated with eNB 210-1 may be implemented or performed by similar base station devices. Each of such devices may transmit to or receive signals from a specified area, herein referred to as a "cell." In one embodiment, eNB 210-1 may operate in unlicensed frequency bands, such as, for example, the 5 GHz and 60 GHz bands, or operate in a shared band, such as the 3.5 GHz band, for example.

Wireless network 206 may include one or more wireless network of any type, such as a WLAN, wireless satellite network, Wi-Fi network, 5G network, 5G NR network, and/or one or more wireless PLMNs. As further shown, wireless network 206 includes a base station 210-2 (e.g., gNB). Similar to eNB 210-1, base station 210-2 may operate in the unlicensed or shared frequency bands (e.g., 5 GHz, 60 GHz, 3.5 GHz bands). Furthermore, base station 210-2 may transmit to cells that are covered by base station 210-1.

When base station 210 (base station 210-1 or base station 210-2) operates in the unlicensed or shared bands, base station 210 may use multiple RATs at the same time. For example, base station 210-2 may transmit to UE devices 202-1 and 202-2 using two RATs at the same time. When base station 210 follows the LBT protocol during downlink transmissions, however, base station 210 may time multiplex transmitted symbols over the RATs during an MCOT interval to avoid interference, as well as to avoid waiting an entire MCOT period before transmission via a different RAT. If a base station 210 uses more than two RATs, the wait times may be as long as (R−1)×MCOT, where R is the number of RATs that base station 210 uses simultaneously in the same band.

Packet data network (PDN) 206 may include a network that supports Internet Protocol (IP)-based communications. PDN 206 may include, for example, an IP Multimedia Subsystem (IMS) network, which may provide voice and multimedia services to user device 202 based on the Session Initiation Protocol (SIP).

Figure 3:
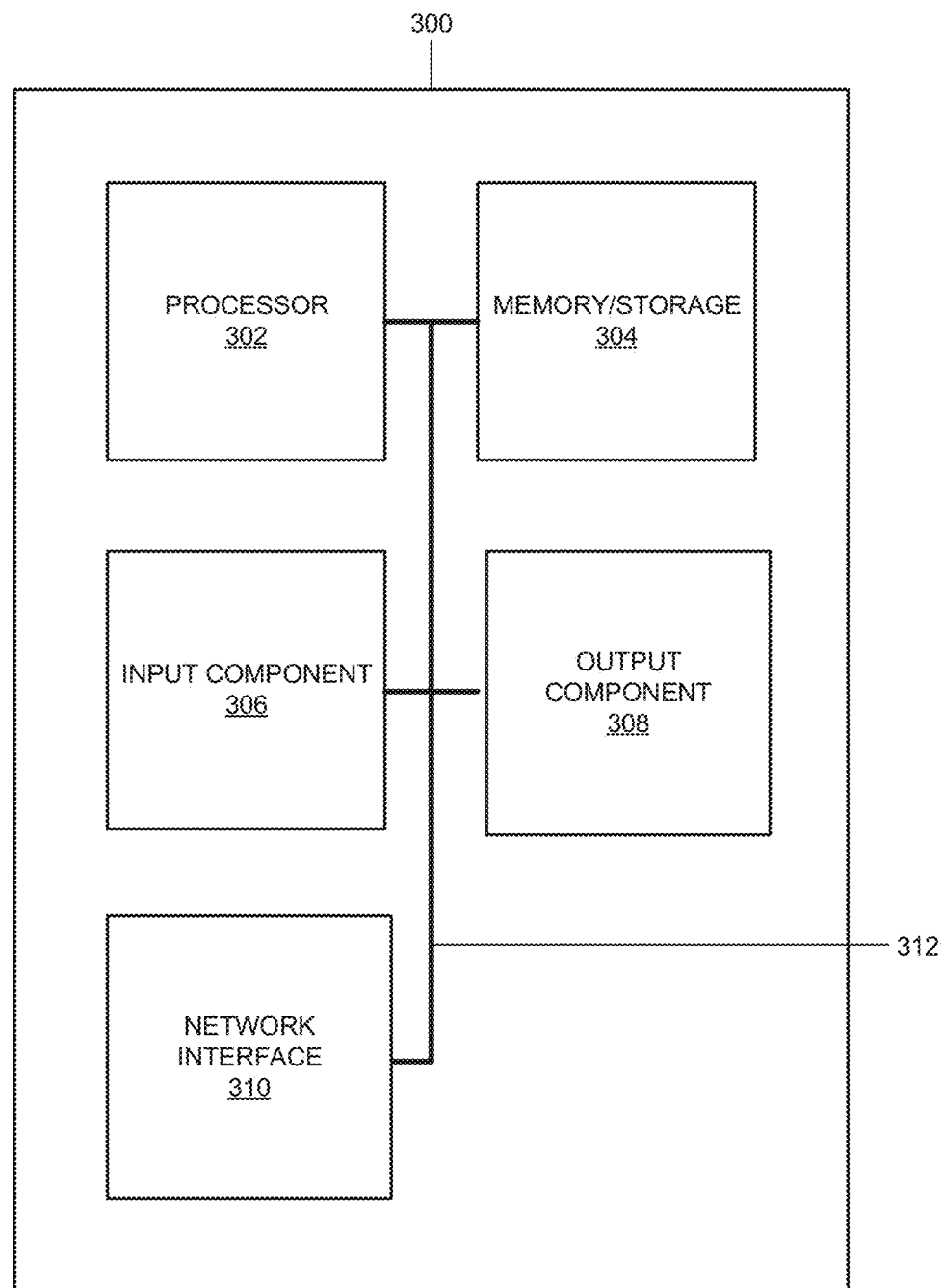
FIG. 3 illustrates exemplary components of network devices included in the networks environment of FIG. 2.

FIG. 3 is a block diagram of exemplary components of a network device 300. Network device 300 may correspond to, or be included in, the devices and/or components of the networks depicted in FIG. 2 (e.g., UE device 202, base station 210, a router, a switch, a server, etc.). In some embodiments, as shown, network device 300 may include a processor 302, memory/storage 304, input component 306, output component 308, network interface 310, and communication path 312. In different implementations, network device 300 may include additional, fewer, different, or a different arrangement of components than the ones illustrated in FIG. 3. For example, network device 300 may include line cards, modems, etc.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory/storage 304 may include static memory, such as read only memory (ROM), and/or dynamic memory, such as random access memory (RAM), or onboard cache, for storing data and machine-readable instructions (e.g., programs, scripts, etc.).

Memory/storage 304 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 304 may be external to and/or removable from network device 300. Memory/storage 304 may include, for example, a Universal Serial Bus (USB) memory stick, a dongle, a hard disk, off-line storage, a Blu-Ray® disk (BD), etc. Memory/storage 304 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 306 and output component 308 may receive input from a user and provide output to a user. Input/output components 306 and 308 may include, for example, a display screen, a keyboard, a mouse, a speaker, a microphone, a camera, a DVD reader, USB lines, and/or other types of components.

Network interface 310 may include a transceiver (e.g., a transmitter and a receiver) for network device 300 to communicate with other devices and/or systems. For example, via network interface 310, network device 300 may communicate over a network, such as the Internet, an intranet, a terrestrial wireless network (e.g., a WLAN, WiFi, WiMax, etc.), a satellite-based network, optical network, etc. Network interface 310 may include a modem, an Ethernet interface to a LAN, and/or an interface/connection for connecting device 300 to other devices (e.g., a Bluetooth interface).

Communication path 312 may provide an interface (e.g., a bus) through which components of device 200 can communicate with one another.

In some implementations, network device 300 may perform the operations described herein in response to processor 302 executing software instructions stored in a non-transient computer-readable medium, such as memory/storage 304. The software instructions may be read into memory/storage 304 from another computer-readable medium or from another device via network interface 310. The software instructions stored in memory/storage 304, when executed by processor 302, may cause processor 302 to perform processes that are described herein. In other implementations, the instructions may be hard coded.

For example, when network device 300 is implemented as UE device 202, UE device 202 may adhere to the LBT protocol, and multiplex symbols over two or more RAT uplink channels in accordance with scheduling information received from a base station. In another example, when network device 300 is implemented as a base station 210, network device 300 may collect information about unlicensed spectrum occupancy (based on measurements or from another base station 210), multiplex symbols over two RATs, and provide uplink transmission scheduling information to UE devices 202.

Figure 4:
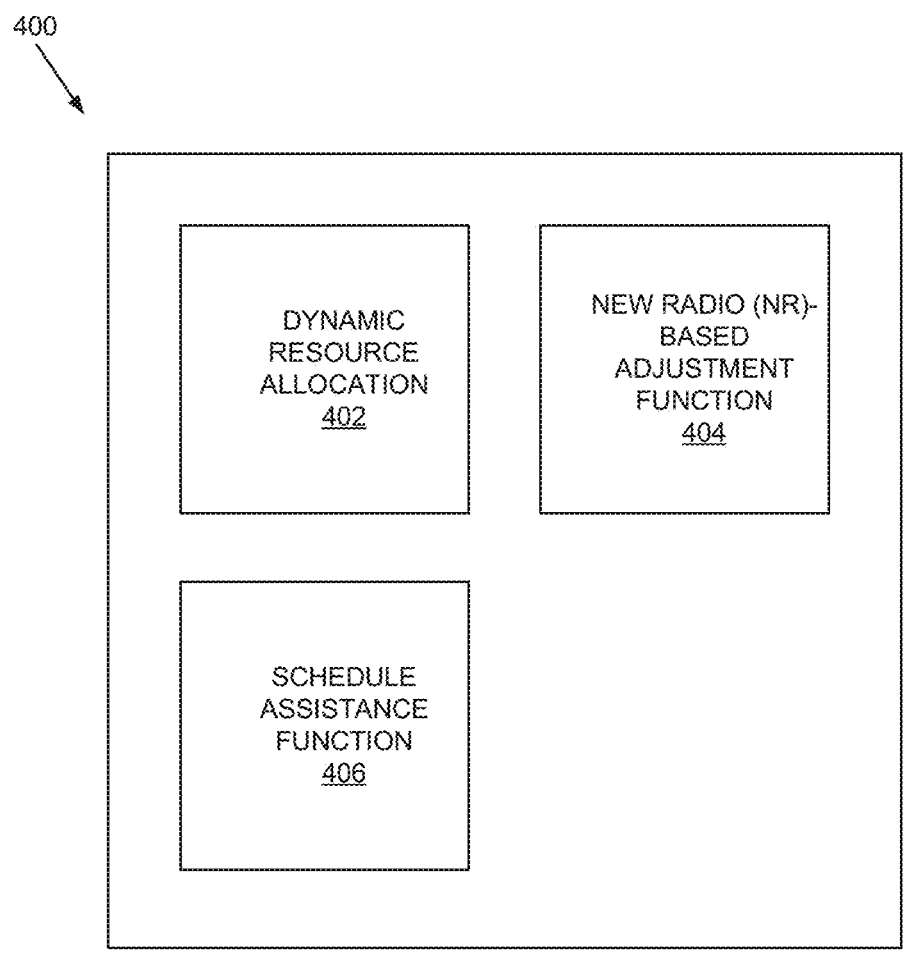
FIG. 4 shows exemplary functional components of a base station in FIG. 2.

FIG. 4 illustrates exemplary functional components of base station 210. As shown, base station 210 may include a Dynamic Resource Allocation function 402, a New Radio (NR) based Adjustment function 404. Dynamic Resource Allocation function 402 may perform uplink and downlink and data/signal scheduling. In scheduling packets, Dynamic Resource Allocation function 402 may use different constraints, such as radio link quality, user priority, requested quality of service, and UE device capabilities.

In one implementation, Dynamic Resource Allocation function 402 may determine whether base station 210 is to perform multi-RAT transmissions in the unlicensed/shared frequency bands. If so, Dynamic Resource Allocation function 402 may obtain information about channel occupancy in the unlicensed/shared spectrum, and generate uplink/downlink schedules based on the LBT protocol and the information. Base station 210 may send the uplink schedules to UE device 202 over downlinks.

In scheduling signal/data over an uplink and a downlink in the unlicensed or shared bands, Dynamic Resource Allocation function 402 may arrange the data/signals as sequence of symbols (e.g., Orthogonal Frequency Division Multiplexed (OFDM) symbols). In the schedule, OFDM symbols that are to be transmitted over one RAT are interleaved with other symbols to be transmitted over other RATs. More specific examples of interleaved symbols are described below with reference to FIGS. 10, 12, and 13.

NR-based Adjustment function 404 may obtain channel occupancy information in the unlicensed and shared bands and provide the information to Dynamic Resource Allocation function 402. NR-based Adjustment function 404 may obtain the occupancy information in two ways: from another base station 210 (e.g., eNB or gNB) over an interface (e.g., X2-AP) or by monitoring the channel energies. In the latter case, when NR-based Adjustment function 404 detects channel energies in the unlicensed/shared band above predetermined thresholds, NR-based Adjustment function 404 may indicate that the channel is occupied.

Schedule Assistance function 406 may aid Dynamic Resource Allocation function 402 in scheduling signal/data transmissions over downlink and uplink channels in the unlicensed/shared bands.

Base station 210 includes many functional components other than those described above. However, for simplicity, they are not illustrated in FIG. 4. For example, base station 210 may include components for: communicating with the core network (e.g., Mobility Management Entity (MME), Serving Gateway (S-GW), etc.); Radio Admission control functions; establishment and maintenance of radio bearers; paging messages; handoff management functions; administering access layer security; etc.

Figure 5:
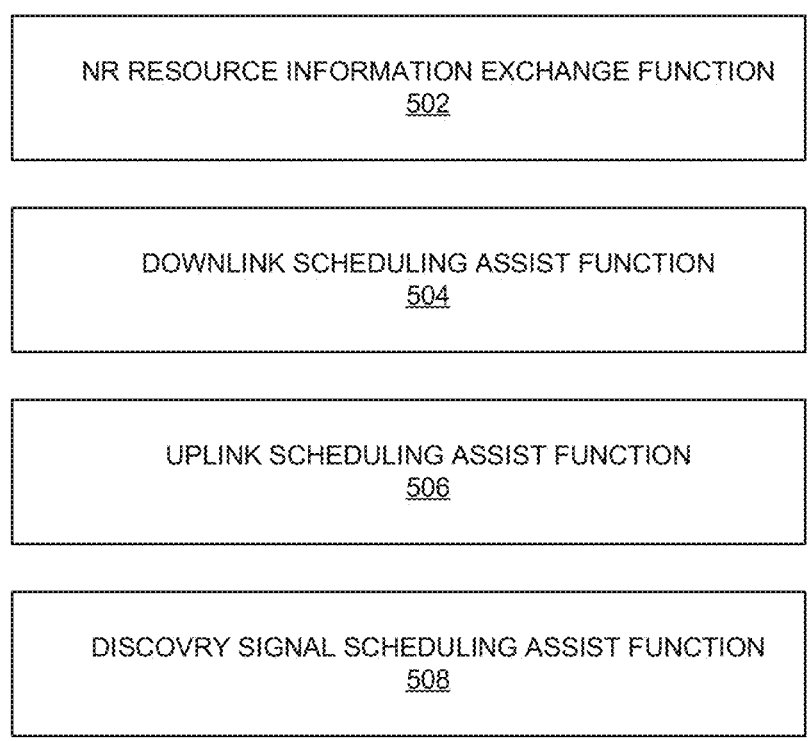
FIG. 5 shows exemplary components of the New Radio (NR)-based Adjustment function of FIG. 4.

FIG. 5 illustrates functional components of Schedule Assistance function 406. As shown, Schedule Assistance function 406 may include NR resource information exchange function 502, Downlink Scheduling Assist function 504, Uplink Scheduling Assist function 506, and Discovery Signal Scheduling Assist function 508. Depending on the implementation, Schedule Assistance function 406 may include additional, fewer, or different functional components than those illustrated in FIG. 5.

NR Resource Information Exchange function 502 may exchange information about the unlicensed or shared bands with other base stations (e.g., eNBs). When two or more base stations are relatively close to one another (e.g., physically), uplink or downlink signal/data transmissions from one base station 210 may affect the same bands used by other base stations 210. Accordingly, NR Resource Information Exchange function 502 sends and/or receives indications, from/to other base stations 210, regarding which unlicensed and shared bands are used by neighboring base stations 210. Upon receipt of the information from NR Resource Information Exchange function 502, Dynamic Resource Allocation function 402 may schedule uplink/downlink symbols over a particular RAT as if multiple RATs are performing concurrent transmissions.

Downlink Scheduling Assist function 504 may indicate, to Dynamic Resource Allocation function 402, which resource blocks may or may not be overwritten for multiplexing downlink multi-RAT transmissions to UE devices 202 for the unlicensed or shared frequency bands. Similarly, Uplink Scheduling Assist function 506 may indicate, to Dynamic Resource Allocation function 402, which resource blocks may or may not be overwritten for multiplexing uplink, multi-RAT transmissions from UE device 202.

Discovery Signal Scheduling Assist function 508 may indicate which resource blocks may or may not be overwritten during multi-RAT transmissions of discovery reference signals (DRS) from base station 210. DRSs are used to aid in cell detection and radio resource management measurements. In some implementations, DRSs may be sent every 40, 80, or 160 milliseconds.

Figure 6A:
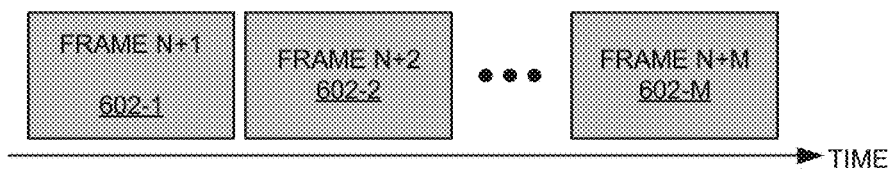
FIG. 6A illustrates exemplary radio frames.
Figure 6B:
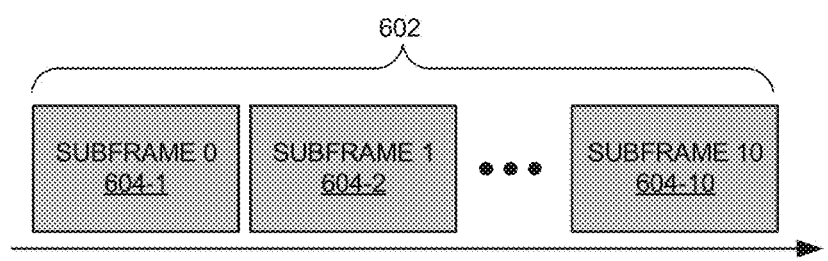
FIG. 6B illustrates exemplary sub-frames of a radio frame of FIG. 6A.
Figure 6C:
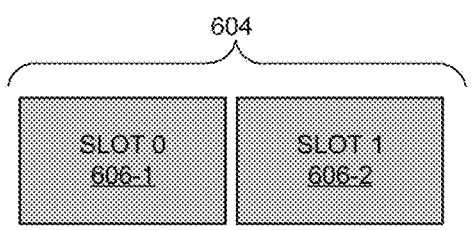
FIG. 6C illustrates exemplary components of a sub-frame of FIG. 6B.

FIGS. 6A through 6E illustrate possible formats of signals/data transmitted by device 104, implemented as either UE device 202 or base station 210. FIG. 6A illustrates exemplary radio frames 602-1 through 602-M that are transmitted by device 104. Each of frames 602 occupies a particular frequency band and spans a particular time interval, which may depend on the particular RAT used. FIG. 6B illustrates exemplary sub-frames of a radio frame of FIG. 6A. As shown, each frame 602 is partitioned into ten sub-frames 604-1 to 604-10. FIG. 6C illustrates exemplary components of a sub-frame 604 of FIG. 6B. As shown, a sub-frame 604 includes two slots 606-1 and 606-2.

Figure 6D:
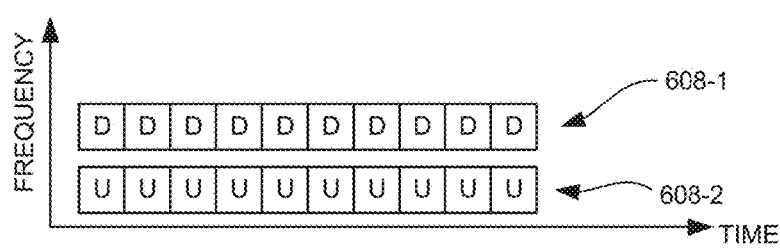
FIG. 6D illustrates exemplary sub-frames of a Frequency Division Duplex (FDD) uplink and downlink channels.
Figure 6E:
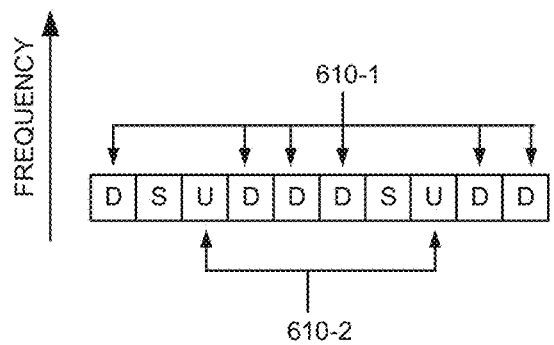
FIG. 6E illustrates exemplary sub-frames of a Time Division Duplex (TDD) uplink and downlink channels.

In FIG. 6A, in an uplink, frames 602 may be transmitted from base station 210 to UE device 202, and in a downlink, the frames 602 may be transmitted from UE device 202 to base station 210. Depending on the implementation, frames 602 in an uplink and a downlink may occupy different frequency bands or the same frequency band. For example, in the frequency division duplex mode (FDD), the uplink frames and downlink frames may occupy different frequency bands. FIG. 6D illustrates exemplary sub-frames of an FDD uplink and downlink channels. As illustrated, uplink sub-frames 608-1 (marked with letter "U") and downlink sub-frames 608-2 (marked with letter "D") occupy different frequency bands. In another example, FIG. 6E illustrates sub-frames of Time Division Duplex (TDD) uplink and downlink channels. Uplink sub-frames 610-1 (marked with "U") and downlink sub-frames 610-2 (marked with "D") occupy the same frequency band. The sub-frames marked with the letter "S" are known as special frames, and are inserted at the transition between a downlink and an uplink sub-frames.

Figure 7:
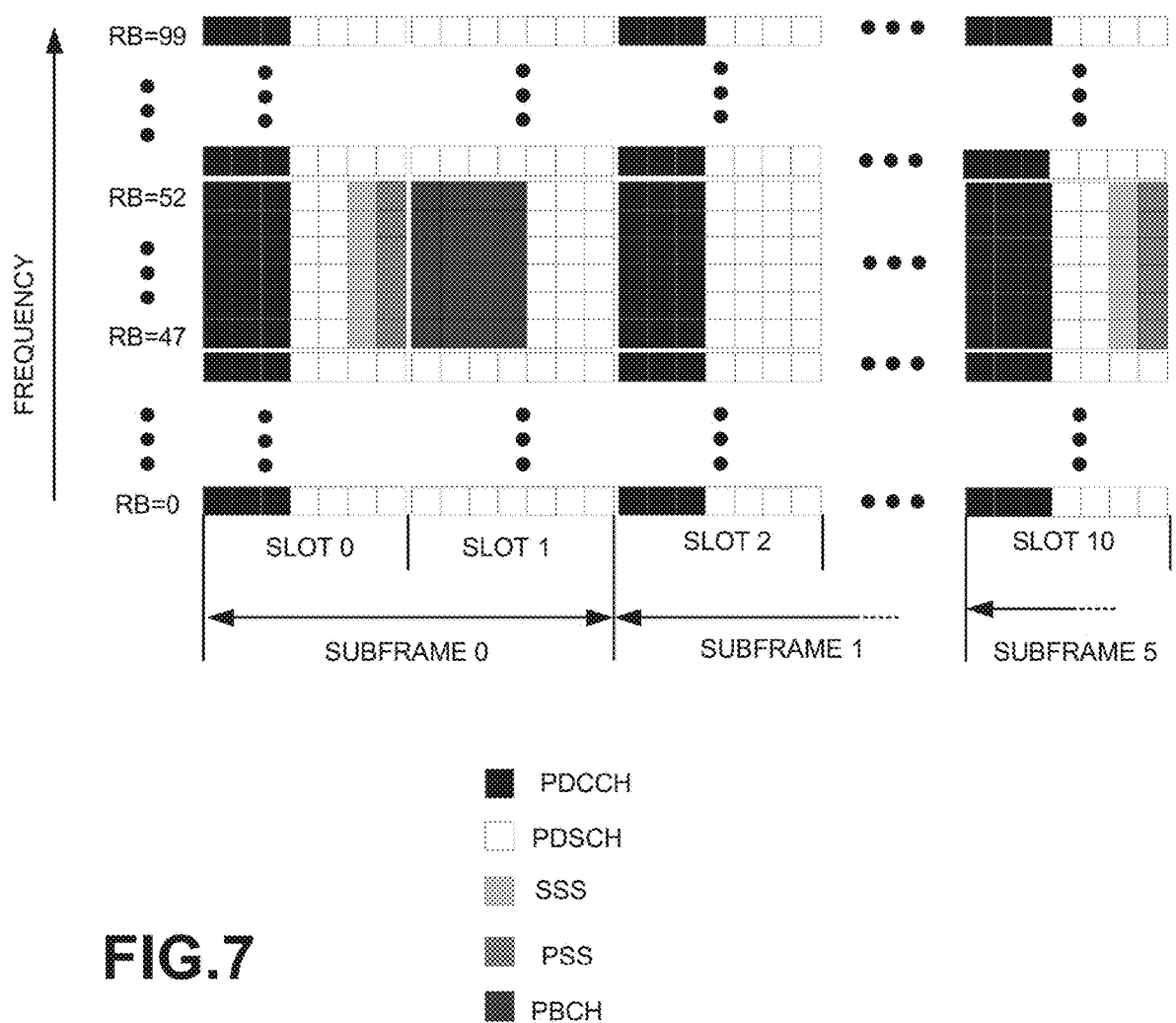
FIG. 7 illustrates an exemplary structure of a radio frame of an FDD downlink channel.

FIG. 7 illustrates an exemplary structure of a radio frame 602 of FDD downlink. In FIG. 7, each square represents a resource block, which is the smallest unit of frequency and time interval that device 104 may allocate (e.g., schedule) for transmission.

Each resource block may span a number of subcarriers (e.g., 12) in frequency and one OFDM symbol duration in time. The spacing of the subcarriers and the symbol duration may depend on the specific RAT and its mode. For example, for LTE, the spacing between the carriers may be 15 kHz and the symbol duration may be 66.67 microseconds, although shorter symbol durations may be used. For 5G NR, the subcarrier spacing may be 15, 30, 120, or 240 kHz, and the symbol duration may be 66.67, 33.33, 8.33, 4.17 microseconds (excluding cyclic prefixes).

In FIG. 7, resource blocks extend from RB=0 to RB=99 in frequency (equivalently 20 MHz) and little over ½ frame (i.e., little over 10 sub-frames) in time. Since each resource block is one OFDM symbol long, each sub-frame includes 14 symbols, and each slot includes 7 OFDM symbols, assuming the standard cyclic prefix (CP).

FIG. 7 also shows different signals and channels that are present within 5 sub-frames. The signals/channels are: physical downlink control channel (PDCCH), physical downlink shared channel (PDSCH), primary synchronization signal (PSS), secondary synchronization signal (SSS), and physical broadcast channel (PBCH). The signals/channels include decoding and timing information necessary for the receiving UE device 202 to synchronize to frames 602 and extract information therefrom.

PDCCH includes information that maps PDSCH, which is the channel for carrying downlink data. PSS is the signal with which UE devices 202 synchronize. Because, however, PSS recurs every 5 sub-frames (rather than 10 sub-frames that are in a single frame), an additional signal, SSS (which comes in two patterns) is provided to allow UE device 202 to distinguish the end of one frame from the start of another frame. Furthermore, a PSS and a SSS convey a cell identifier to the receiving UE device 202. Once UE device 202 determines the physical cell identifier from the PSS and SSS, UE device 202 can obtain a cell-specific reference signal (CRS), which is present in every resource block (CRS is not shown). CRS may be used by UE device 202 for channel power determination and channel estimation.

PBCH includes information for decoding a frame, such as a Master Information Block (MIB). A MIB conveys the downlink bandwidth, the system frame number, and some configuration information regarding logical channels (e.g., physical hybrid ARQ channel) to UE device 202.

In FIG. 7, PDCCH, PDSCH, PSS, SSS, and PBCH are illustrated in different shades of grayscale. For PDSCH, not all white blocks represent resource blocks that carry payload, but only the potential locations of PDSCH. The exact locations of PDSCH depend the values of PDCCH. Accordingly, during multiplexing, the NR symbols can be superimposed over the unused portions of the white resource blocks. Because UE device 202 uses PDCCH, PDSCH, PSS, SSS, and PBCH for reading the frames, base station 210 may not superimpose NR OFDM symbols over the resource blocks actually carrying PDCCH, PDSCH, PSS, SSS, and PBCH.

In FIG. 7, the frames are for FDD. In TDD frames, the PSS is sent in the third OFDM symbol in sub-frame 1, and sub-frame 6, and the SSS is sent in the last OFDM symbol of sub-frame 0 and sub-frame 5. PDCCH may use up to two OFDM symbols in sub-frames 1 and 6, and in other sub-frames, up to 3 or 4 OFDM symbols may be occupied by the PDCCH. There are additional differences between TDD and FDD frames, such as one involving HARQ, as well as the ACK/NACK messages. These latter differences may or may not result in different availabilities of resource blocks for multiplexing LTE and NR OFDM symbols in the unlicensed/shared frequency bands, for TDD and FDD downlink frames.

Figure 8:
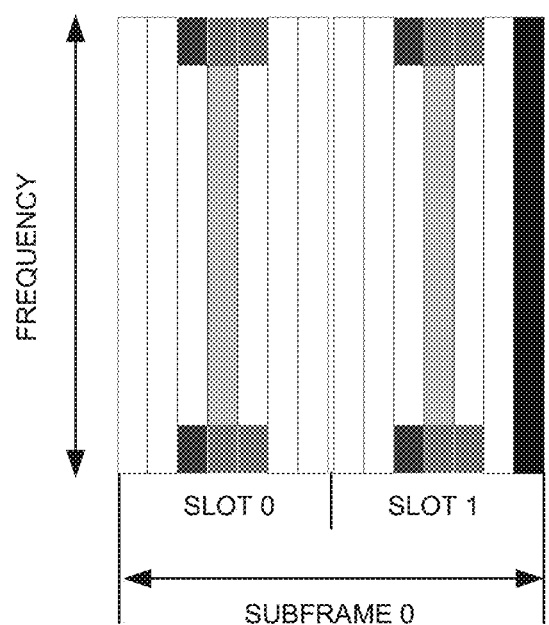
FIG. 8 illustrates an exemplary structure of a radio frame of an FDD uplink channel.

FIG. 8 illustrates an exemplary structure of a sub-frame of FDD uplink. As illustrated, the sub-frame may include: physical uplink control channel-reference signal (PUCCH-RS), PUCCH, physical uplink shared channel reference signal (PUSCH-RS), PUSCH and a sounding reference signal.

PUCCH-RS carries the reference signal for demodulating PUCCH. PUCCH may include a number of control messages, such as ACK/NACK, scheduling request, channel quality indicator (CQI), from UE device 202. PUSCH-RS contains the reference signal for demodulating PUSCH. PUSCH may carry uplink data that UE device 202 forwards to base station 210. A SRS includes a reference signal, to allow base station 210 to determine the uplink channel quality.

In FIG. 8, PUCCH-RS, PUCCH, PUSCH-RS, PUSCH, and SRS are illustrated in different shades of grayscale. As shown, white columns (in the sub-frame), which carries PUSCH may carry data. Accordingly, UE device 202 may superimpose NR OFDM symbols over the unused portions of the white columns (which is comprised of resource blocks), for multiplexing the NR OFDM symbols and LTE OFDM symbols. In multiplexing, UE device 202 may not superimpose NR OFDM symbols over portions that actually carry PUCCH-RS, PUCCH, PUSCH-RS, PUSCH, and/or SRS.

Figure 9:
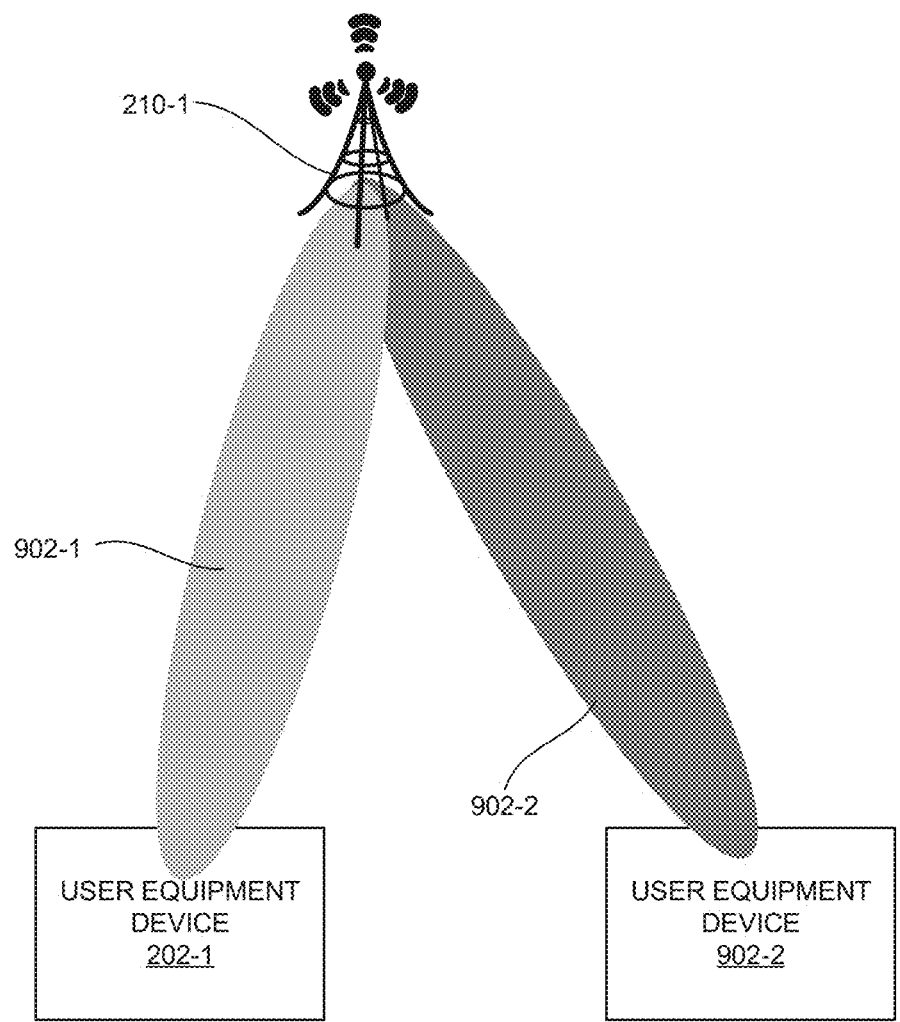
FIG. 9 illustrates an exemplary scenario in which symbols of Long Term Evolution (LTE) are multiplexed with symbols of New Radio (NR)

FIG. 9 illustrates an exemplary scenario in which symbols of LTE are multiplexed with symbols of NR. As shown, base station 210-1 (e.g., eNB or gNB) establishes an FDD LTE downlink 902-1 with UE device 202-1 and an NR FDD downlink 902-2 with UE device 202-2. Both links 902-1 and 902-2 are in either an unlicensed band or a shared frequency band.

As base station 210 adheres to the LBT protocol for downlink transmissions, base station 210 may time multiplex transmitted symbols over links 902-1 and 902-2 during an MCOT interval, rather than transmitting LTE symbols over link 902-1 during one MCOT, and then transmitting NR symbols over link 902-2 during another MCOT.

Figure 10:
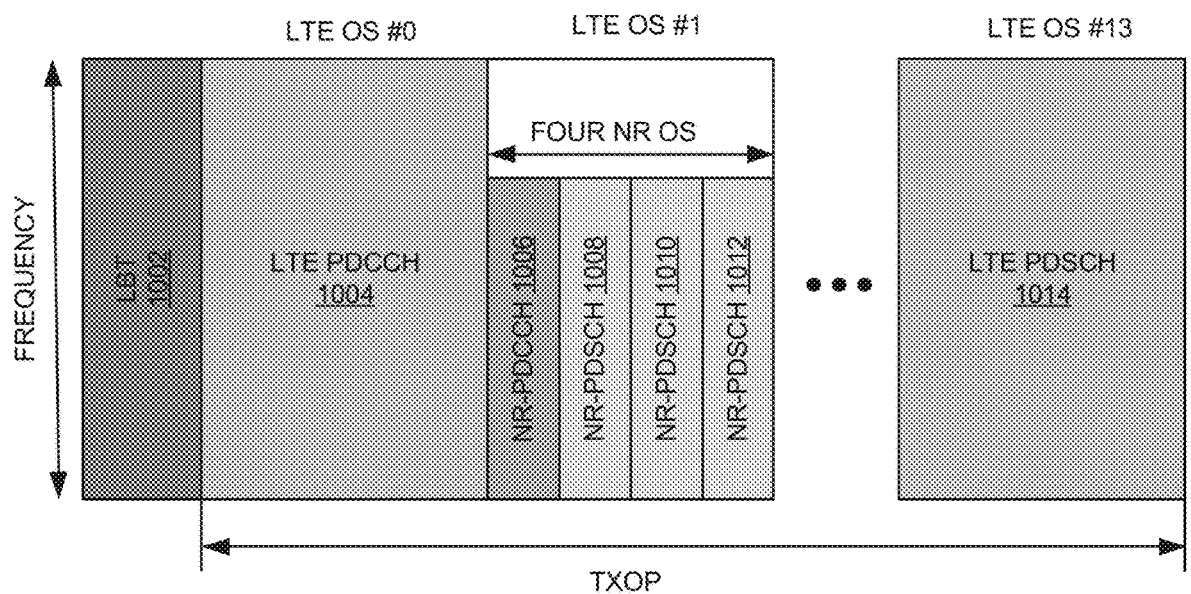
FIG. 10 illustrates exemplary multiplexing of LTE symbols and NR symbols in the scenario of FIG. 9.

FIG. 10 illustrates exemplary multiplexing of LTE symbols and NR symbols in the scenario of FIG. 9, for the unlicensed/shared band. As shown, base station 210 performs a monitoring over LBT period 1002. Then, base station 210 schedules essential structural components of LTE frames in accordance with FIG. 7. For example, base station 210 may schedule LTE PDCCH 1004 for LTE OFDM symbol #0, to be sent over link 902-1.

From FIG. 7, a frame may have LTE PDSCH following LTE PDCCH (depending on LTE PDCCH values). Assuming that there is no LTE PDSCH in LTE symbol #1 time interval, base station 210 schedules 4 NR symbols, NR-PDCCH 1006, NR-PDSCH 1008, NR-PDSCH 1010, and NR-PDSCH 1012 over the interval. Base station 210 may continue to fill in essential signals/channels in accordance with the LTE frame structure illustrated in FIG. 7, determine empty LTE OFDM symbol time intervals, and insert NR OFDM symbols, until LTE OS #13, which carries an LTE PDSCH. Depending on LTE PDCCH and NR-PDCCH values, the locations of the LTE OFDM symbols and NR OFDM symbols may occupy different time locations than those illustrated in FIG. 10. The arrangement of the symbols may also partly depend on relative priorities of LTE and NR transmissions. Furthermore, because signal and channel locations within frames are different for FDD and TDD, scheduled time locations of multiplexed LTE OFDM symbols and NR OFDM symbols for NR would be different for FDD and TDD.

Figure 11:
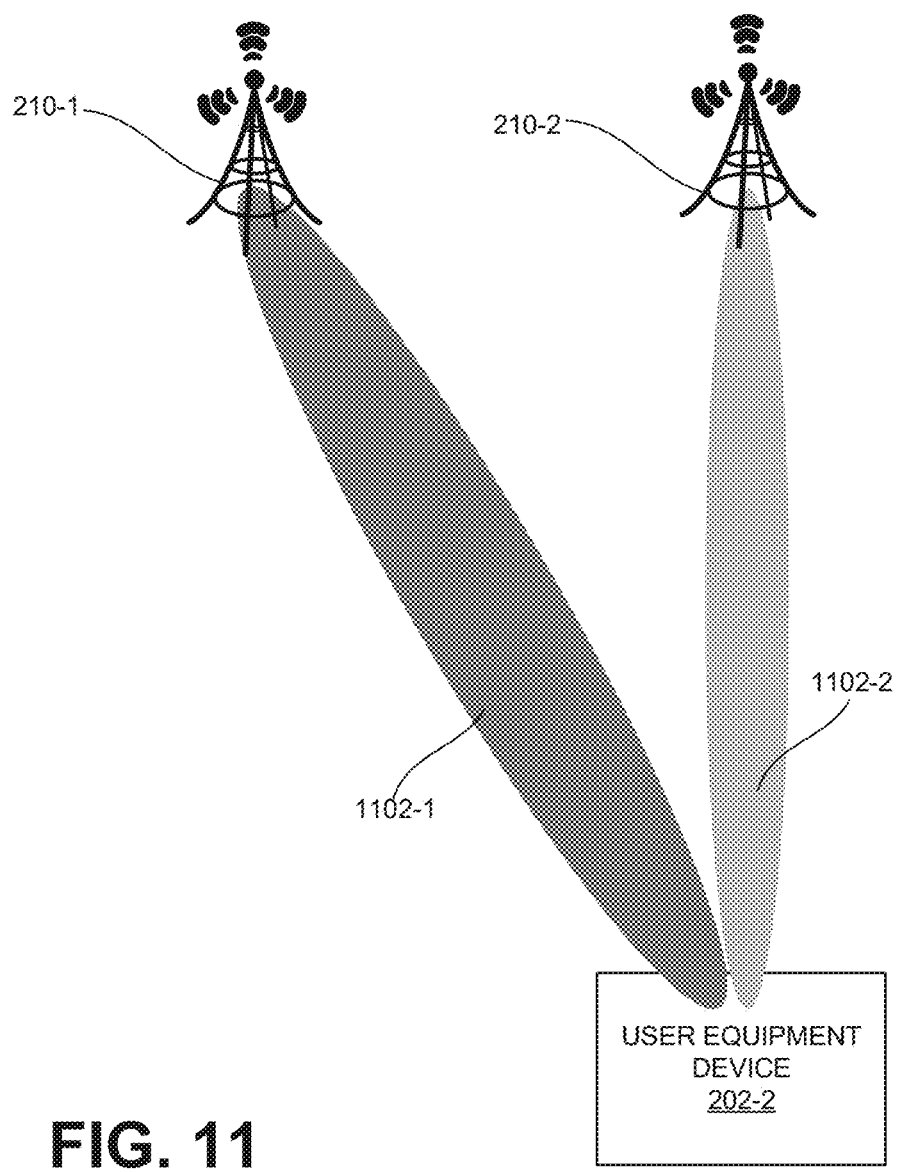
FIG. 11 illustrates another exemplary scenario in which LTE symbols are multiplexed with NR symbols.

FIG. 11 illustrates another exemplary scenario in which LTE symbols are multiplexed with NR symbols. As shown, UE device 202-2 establishes an FDD LTE uplink 1102-1 with base station 210-1 and an NR FDD uplink 1102-2 with base station 210-2. Both links 1102-1 and 1102-2 are in either an unlicensed band or the shared frequency band.

When UE device 202-2 follows the LBT protocol for uplink transmissions, UE device 202-2 may time multiplex transmitted symbols over links 1102-1 and 1102-2 during an MCOT, rather than transmitting LTE symbols over link 1102-1 during one MCOT, and then transmitting NR symbols over link 1102-2 during another MCOT.

Figure 12:
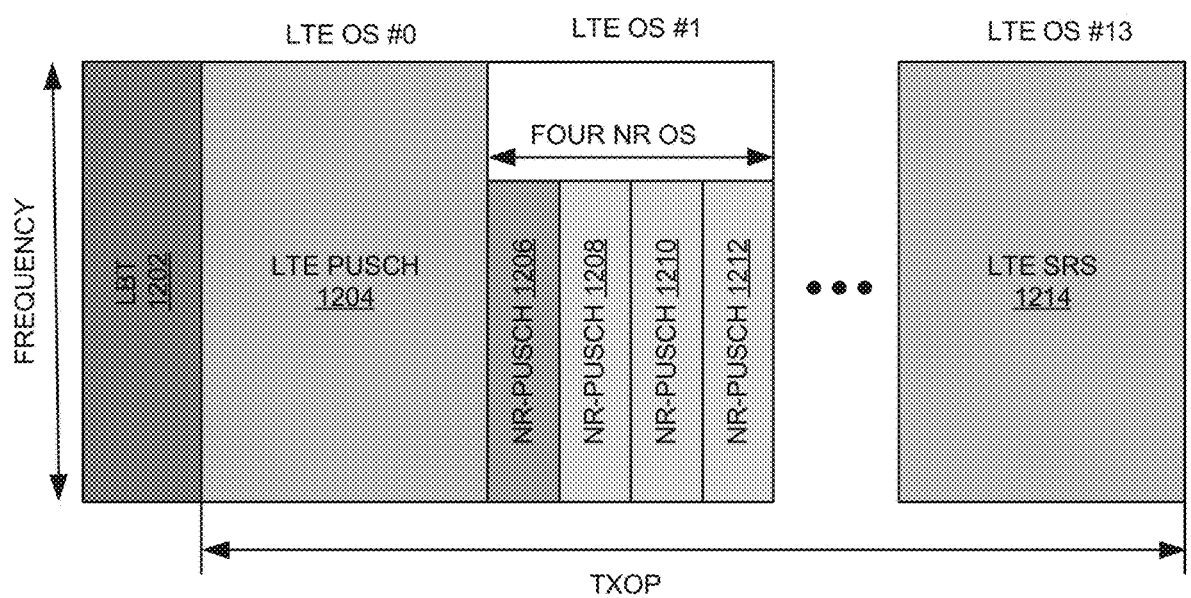
FIG. 12 illustrates exemplary multiplexing of LTE symbols and NR symbols in the scenario of FIG. 11.

FIG. 12 illustrates exemplary multiplexing of LTE symbols and NR symbols in the scenario of FIG. 11, for the unlicensed/shared band. As shown, UE device 202-2 performs a monitoring over LBT period 1202. Then, UE device 202-2 schedules essential structural components of an LTE uplink frame in accordance with FIG. 8: LTE PUSCH 1204 for LTE OFDM symbol #0, to be sent over link 1102-1. Assuming that there is no LTE PUSCH in LTE symbol #1, UE device 202-1 sends 4 NR OFDM symbols, NR-PUSCH 1206, NR-PUSCH 1208, NR-PUSCH 1210, NR-PUSCH 1212 over the time interval in which LTE symbol #1 could be sent. UE device 202-2 may continue to determine empty LTE OFDM symbol locations (to insert NR OFDM symbols), until LTE OS #13, which is a LTE SRS (mandatory according to the frame structure illustrated in FIG. 8). Depending on LTE PUSCH-RS and NR-PUSCH-RS, the time locations of the LTE OFDM symbols and NR OFDM symbols may occupy different intervals than those illustrated in FIG. 12. The arrangement of the symbols may also depend on relative priorities of LTE and NR transmissions.

Figure 13:
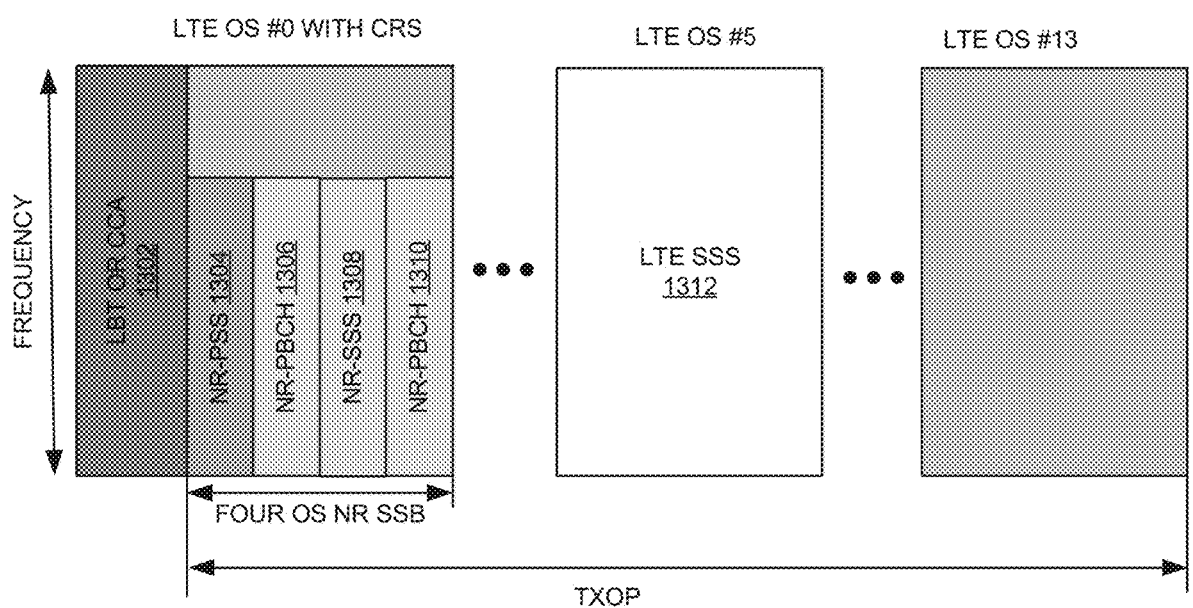
FIG. 13 illustrates exemplary multiplexing of LTE discovery reference signal (DRS) and NR synchronization sequence block (SSB) signal.

FIG. 13 illustrates exemplary multiplexing of LTE discovery reference signal (DRS) and NR synchronization sequence block (SSB). The DRS and SSB may be transmitted from a single base station 210 (eNB/gNB) over LTE and NR RATs in the same unlicensed frequency channel(s). LTE DRS transmissions may occur periodically every 40, 80, or 160 milliseconds. In the unlicensed bands, both DRS s and SSBs may have the same periodicity.

An LTE DRS may include at least a PSS (not shown), an SSS 1312, and a CRS, while SSBs include an NR-PSS 1304, an NR-SSS 1308, and NR-PBCHs 1306 and 1310. Both LTE and NR UE devices may perform cell detection and radio resource management (RRM) measurements in the same transmission opportunity (TXOP) or MCOT, while requiring a single downlink LBT 1302 (or a clear channel assessment (CCS)) at the transmitter. Multiple NR SSBs may be transmitted within one LTE DRS. As in FIGS. 10, 12, the symbol duration of LTE is shown as a multiple of the duration of NR symbols.

Figure 14:
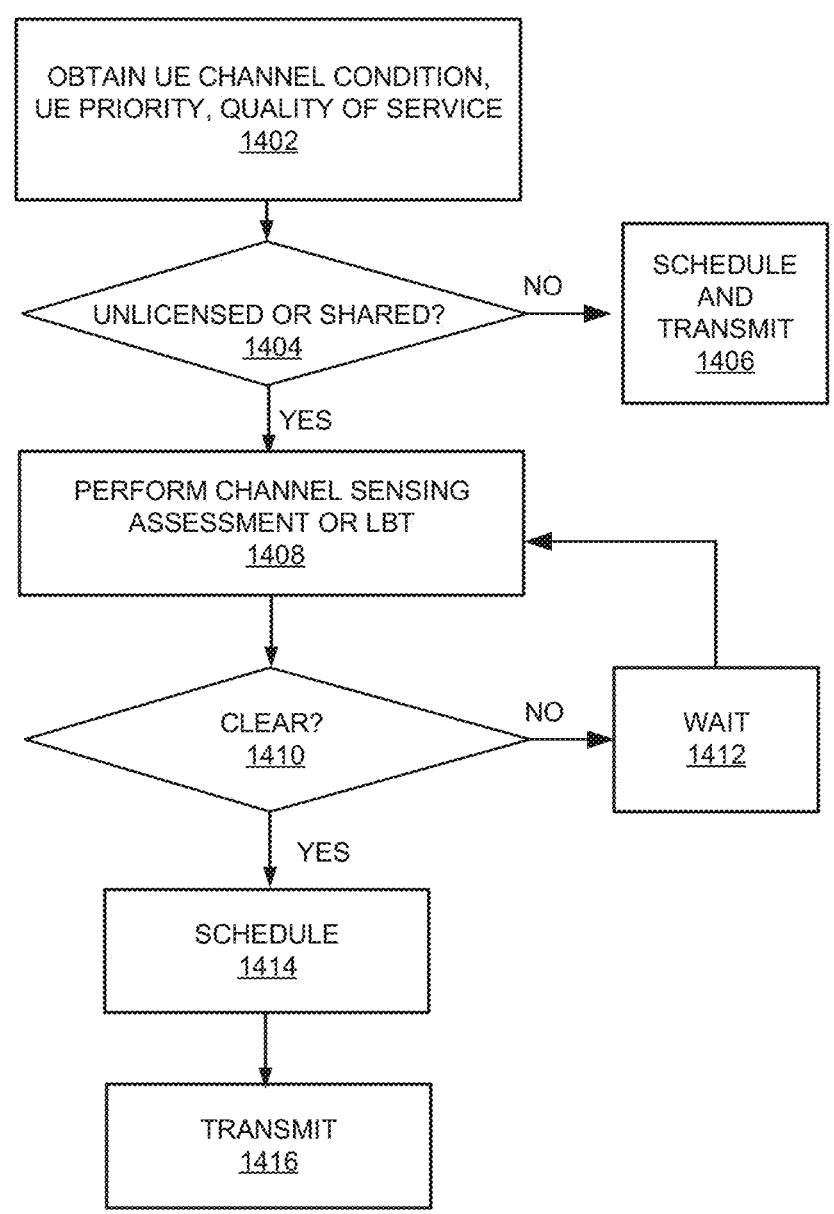
FIG. 14 is a flow diagram of a process that is associated with multiplexing LTE symbols and NR symbols in an unlicensed or shared frequency band.

FIG. 14 is a flow diagram of a process 1400 that is associated with multiplexing LTE symbols and NR symbols in an unlicensed or shared frequency band. Process 1400 may be performed by device 104, which may be implemented as a UE device 202 or a base station 210 (e.g., eNB and gNB).

Process 1400 may begin with obtaining channel condition-related information, such as a UE priority, requested QoS, signal strength, and or other information necessary for scheduling packets over a downlink or an uplink (e.g., noise level, interference, etc. (block 1402). Some of the information may be directly obtained from measurements, and other parameters may be obtained from another base station 210 or UE device 202.

Process 1400 may further include determining whether transmission is to occur in the unlicensed or shared band(s) (block 1404). If the transmission is not to be performed in the unlicensed or shared band(s) (block 1404: NO), process 1400 may proceed to block 1406. At block 1406, device 102 may transmit the symbols in the licensed bands. Otherwise (block 1404: YES), process 1400 may proceed to block 1408.

Device 104 may perform the listening part of the LBT protocol or a clear channel sensing assessment (block 1408). As the result of the channel sensing, if device 104 determines that the unlicensed or the shared band is not clear (block 1410: NO), device 104 may wait for an appropriate duration (block 1412), and then return to block 1408, to perform another listening. If the band is clear (e.g., energy in the channel is less than a pre-determined threshold) (block 1410: YES), process 1400 may proceed to block 1414.

At block 1414, device 104 may generate a schedule for transmitting symbols in the unlicensed or shared frequency band (block 1414). Device 104 may then transmit the symbols over both RATs in accordance with the schedule (block 1416). In the schedule, symbols for each of the RATs may be interleaved over a single MCOT (or a transmission opportunity—TXOP), as illustrated for LTE RAT and 5G NR RAT example in FIGS. 9 and 10.

If device 102 were implemented as base station 210 executing a process for an uplink schedule for UE device 202, device 104 may still perform blocks 1402 through 1404 and generate an uplink schedule, based on the information that UE device 202 will use multi-RATs. Device 104 may then forward the schedule to UE device 202 over a downlink channel. In this example, device 104 may recognize that UE device 102 will be transmitting through multi-RATs based on information it obtains from another base station 210 or from UE device 202 itself. After UE device 102 obtains the uplink scheduling information, UE device 202 may perform the LBT protocol before transmitting the symbols in accordance with the schedule.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIG. 14, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
    a communication interface;
    a memory device to store a set of processor-executable instructions; and
    one or more processors configured to execute the processor-executable instructions, wherein executing the processor-executable instructions causes the one or more processors to:
        monitor a frequency band over a time interval;
        determine that the frequency band is not occupied by transmissions to or from another device based on information obtained from monitoring the frequency band over the time interval;
        schedule first transmissions of a first set of orthogonal frequency division multiple access (OFDM) symbols, within a particular time interval, which fully occupy a range of frequencies in the frequency band, wherein the first transmissions are to be performed using a first radio access technology; and
        schedule second transmissions of a second set of OFDM symbols, within the particular time interval, which also fully occupy the range of frequencies in the frequency band, wherein the second transmissions are to be performed using a second radio access technology, and
    wherein time-frequency locations of the second set of OFDM symbols within the particular time interval either do not overlap time-frequency locations of signals or channels of a radio frame comprising the scheduled first set of OFDM symbols, or partially overlap the time-frequency locations of the signals or channels of the radio frame in a manner known to a second device receiving the radio frame.

2. The device of claim 1, wherein the particular time interval comprises a maximum channel occupancy time for the frequency band.

3. The device of claim 1, wherein the signals or channels comprise one or more of:
    a primary synchronization signal;
    a secondary synchronization signal;
    a downlink reference signal;
    a physical downlink control channel; or
    a physical downlink shared channel.

4. The device of claim 1, wherein the signals or channels comprise one or more of:
    a physical uplink shared channel;
    an uplink reference signal;
    a physical random access channel; or
    a physical uplink control channel.

5. The device of claim 1, wherein the first set of OFDM symbols comprises Long-Term Evolution (LTE) OFDM symbols; and
    wherein the second set of OFDM symbols comprises New Radio OFDM symbols.

6. The device of claim 5, wherein each symbol in the set of LTE OFDM symbols has a time duration that is a multiple of a time duration of each symbol of the NR OFDM symbols.

7. The device of claim 1, wherein the device is an evolved node B (eNB), a gNB, or a user equipment (UE) device.

8. The device of claim 1, wherein the frequency band comprises:
    an unlicensed spectrum; or a shared spectrum.

9. The device of claim 1, wherein the radio frame comprises a time division duplex (TDD) radio frame.

10. The device of claim 1, wherein when the one or more processors schedule the second set of OFDM symbols, the one or more processors are to determine:
    a channel condition;
    a user device priority; or
    a requested quality of service.

11. A method comprising:
    monitoring, by a device, a frequency band over a time interval;
    determining, by the device, that the frequency band is not occupied by transmissions to or from another device based on information obtained from monitoring the frequency band over the time interval;
    scheduling, by the device, first transmissions of a first set of orthogonal frequency division multiple access (OFDM) symbols, within a particular time interval, which fully occupy a range of frequencies in the frequency band, wherein the first transmissions are to be performed using a first radio access technology; and
    scheduling, by the device, second transmissions of a second set of OFDM symbols, within the particular time interval, which also fully occupy the range of frequencies in the frequency band, wherein the second transmissions are to be performed using a second radio access technology, and wherein time-frequency locations of the second set of OFDM symbols within the particular time interval either do not overlap time-frequency locations of signals or channels of a radio frame comprising the scheduled first set of OFDM symbols, or partially overlap the time-frequency locations of the signals or channels of the radio frame in a manner known to a second device receiving the radio frame.

12. The method of claim 11, wherein the particular time interval comprises a maximum channel occupancy time for the frequency band.

13. The method of claim 11, wherein the signals or channels comprise one or more of:
a primary synchronization signal;
a secondary synchronization signal;
a downlink reference signal;
a physical downlink control channel; or
a physical downlink shared channel.

14. The method of claim 11, wherein the signals or channels comprise or more of:
a physical uplink shared channel;
an uplink reference signal;
a physical random access channel; or
a physical uplink control channel.

15. The method of claim 11, wherein the first set of OFDM symbols comprises Long-Term Evolution (LTE) OFDM symbols; and
wherein the second set of OFDM symbols comprises New Radio OFDM symbols.

16. The method of claim 15, wherein each symbol in the LTE OFDM symbols has a tune duration that is a multiple of a time duration of each symbol of the NR OFDM symbols.

17. The method of claim 1, wherein the device is an evolved node B (eNB), a gNB, or a user equipment (UE) device.

18. The method of claim 11, wherein the frequency band comprises:
an unlicensed spectrum; or
a shared spectrum.

19. The method of claim 11, wherein the radio frame comprises a frequency division duplex (FDD) radio frame.

20. The method claim 11, wherein scheduling the second set of OFDM symbols comprises determining at least one of:
a channel condition;
a user device priority; or
a requested quality of service.

* * * * *